United States Patent [19]
Ohkubo et al.

[11] Patent Number: 5,118,548
[45] Date of Patent: Jun. 2, 1992

[54] SUBSTRATE FOR INFORMATION-RECORDING MEDIA

[75] Inventors: Tsuyoshi Ohkubo, Hachioji; Mayumi Kageyama, Akishima; Reisuke Okada, Nishitama; Takeyuki Sawamoto, Suginami, all of Japan

[73] Assignee: Hoya Corporation, Tokyo, Japan

[21] Appl. No.: 509,582

[22] Filed: Apr. 16, 1990

[30] Foreign Application Priority Data

Apr. 28, 1989 [JP] Japan .................................. 1-111494

[51] Int. Cl.$^5$ .............................................. B32B 3/00
[52] U.S. Cl. ........................................ 428/64; 428/65; 428/913; 430/945; 346/76 L; 346/135.1; 369/288
[58] Field of Search ................ 428/64, 65, 913; 430/945; 346/76 L, 135.1; 369/288

[56] References Cited

U.S. PATENT DOCUMENTS 4,944,980  7/1990  Akutsu et al. .................... 428/64
5,063,096  11/1991  Kohara et al. .................... 428/64

Primary Examiner—Patrick J. Ryan
Assistant Examiner—Elizabeth Evans
Attorney, Agent, or Firm—Nixon & Vanderhye

[57] ABSTRACT

The present invention relates to a substrate for information-recording media, which is formed of a polymer containing a specific acrylate-based monomer as an essential component. Since the acrylate-based monomer has a rigid skeleton similar to that of bisphenol A, the substrate for recording media, formed of the polymer of such a monomer, has high hardness and excellent heat resistance. Further, due to six fluorine atoms that the acrylate-based monomer contains, the substrate has advantages of low water absorptivity and easy die removability.

10 Claims, No Drawings

SUBSTRATE FOR INFORMATION-RECORDING MEDIA

BACKGROUND OF THE INVENTION

1. Field of the Invention

This invention relates to a substrate for information-recording media.

2. Prior art

In information-recording media according to optical recording system, etc., the substrate on which a recording layer is laminated has a fine concave/convex-formed groove. This fine concave/convex-formed groove means concentric grooves or a spiral groove for tracking of a laser head, digitalized information pits, and the like. The substrate having such a fine concave/convex-formed groove is formed, e.g. by injection-molding a thermoplastic resin such as polymethyl methacrylate, polycarbonate, or the like.

Such a substrate having a fine concave/convex-formed groove is also formed by a method which comprises coating a transparent flat base plate with a UV ray-curable monomer to form a coating having a uniform thickness, bringing a die plate having a predetermined concave/convex form into contact therewith under pressure, irradiating the coating with UV ray from the transparent base plate side to cure the UV ray curable monomer, and then separating the die plate (this method is called a photopolymer method, and will be abbreviated as 2P method hereinafter). A variety of UV ray-curable monomer compositions have been hitherto proposed for a 2P method. For example. Japanese Unexamined Patent Publication No. 62-264459 discloses a monomer composition composed mainly of a (meth)acrylate having a bisphenol A skeleton.

Further, a substrate having a concave/convex-formed groove is also produced by a method of cast-molding a liquid monomer composition in a mold which is provided with a predetermined concave/convex form on one surface thereof. As a liquid monomer composition useful for this method, Japanese Unexamined Patent Publication No. 63-86710 dislcoses a monomer composition composed mainly of an epoxy acrylate and an alicyclic di(meth)acrylate such as bis(meth)acryloxymethyltricyclo[5,2,1,0$^{2.6}$] decane, or the like.

However, the polymethyl methacrylate and polycarbonate used in the injection-molding method have defects in that they are poor thermal dimensional stability and are liable to cause a change such as warpage during storage for a long period of time. And, a polycarbonate substrate having a predetermined concave/convex-formed groove, produced by the injection-molding method, has a defect of a large birefringence.

Further, the UV ray-curable monomer composition composed mainly of a (meth)acrylate having a bisphenol A skeleton, useful for the 2P method and disclosed in Japanese Unexamined Patent Publication No. 62-264459, has the following defects. Its polymerizability with UV ray is unsatisfactory, and it does not give hardness and heat resistance sufficient to satisfactorily endure deformation resulting from heat and longterm storage. It also has a defect of poor replication accuracy.

The monomer composition composed mainly of an epoxy (meth)acrylate, useful for the cast-molding method and described in Japanese Unexamined Patent Publication No. 63-86710, has advantageous characteristics in that it is excellent in moldability and available at a low cost and has low birefringence. However, this monomer composition still has the following defects. That is, a polymer of this composition is that which is produced by polymerization of an epoxy (meth)acrylate as an essential monomer and the polymer has a low surface hardness. Further, the polymer has a hydroxyl group. Hence. the polymer has high water absorptivity, and the resultant substrate has poor dimensional stability. And, when a recording layer is laminated on the substrate, it is liable to be corroded. For these reasons, the resultant recording medium has a defect of poor reliability for long-term storage of recorded information.

Furthermore, after the compositions described in the above Publications are cured by UV ray or cast-polymerized, it is difficult to separate the resultant polymer from a die plate. And, when stamping operation in the 2P method or the castmolding is repeated, the cured or polymerized polymer builds up on the die plate, and the replication accuracy is deteriorated.

SUMMARY OF THE INVENTION

It is an object of this invention to provide a substrate for information recording media, which exhibits high molding accuracy, high die removability, low birefringence, high surface hardness and high heat resistance, and which also has low water absorptivity and excellent storage stability.

Other ojects of this invention will be apparent from the following descriptions.

This invention has been made to achieve the above objects, and, according to this invention, there is provided a substrate for information recording media, on which a recording layer is formed and at least a part of which is composed of a polymer containing, as an essential monomer component, a monomer represented by general formula (I)

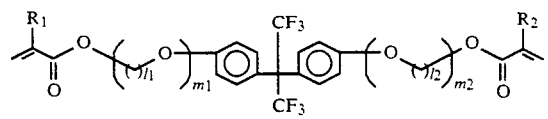

wherein each of $l_1$ and $l_2$ represents an integer of from 1 to 5 and may be the same as, or different from, the other, each of $m_1$ and $m_2$ represents an integer of from 0 to 5 and may be the same as, or different from, the other, and each of $R_1$ and $R_2$ represents a hydrogen atom or a methyl group, and may be the same, or different from, the other.

This invention will be explained in detail hereinbelow.

The substrate for information-recording media, provided by this invention, is used as a substrate on which a recording layer is to be formed. Examples of the present substrate for information-recording media include the following types.

(i) Substrate (A) produced by forming the polymer into a concave/convex-formed groove ($a_2$) on a flat base plate ($a_1$) by a 2P method or a thermal polymerization method.

(ii) Substrate (B) formed by cast-molding one monomer composition in a casting mold prepared by using an original disk having a concave/convex form, in which a flat base plate ($b_1$) and a concave/convex-formed groove ($b_2$) are integrally formed of one polymer at one step.

In addition, there is also an information recording medium produced by forming a recording layer on a substrate having no concave/convex form, and the scope of the substrate for information-recording media, provided by this invention, also includes the following.

(iii) Substrate (C) formed of one layer or a multilayer laminate, of which both surfaces are planar.

In this invention, the substrate for information-recording media is at least partially composed of a polymer containing, as an essential monomer, a monomer of general formula (I) (this polymer is referred to as "present polymer" hereinafter).

More specifically, for example, in the above substrate (A), only the flat base plate ($a_1$) may be formed of the present polymer, or only the concave/convex-formed groove ($a_2$) may be formed of the present polymer. In the latter case, the flat base plate ($a_1$) is formed of glass, a metallic material such as aluminum, or a plastic material other than the present polymer. Further, both the flat base plate ($a_1$) and the concave/convexformed groove ($a_2$) may be formed of the present polymer.

In the above substrate (B), the flat base plate ($b_1$) and the concave/convex-formed groove ($b_2$) can be integrally formed of the present polymer at one step.

Further, when the above substrate (C) having planar surfaces is formed of one layer, the substrate is totally formed of the present polymer. When the substrate (C) is formed of a multi-layer laminate, at least one layer of the laminate may be formed of the present polymer.

The monomer represented by general formula (I) for the formation of the present polymer has a skeleton similar to that of rigid bisphenol A. Hence, the polymer exhibits high hardness and excellent heat resistance. Further, since this monomer has six fluorine atoms, it has advantages of low water absorptivity and ease in mold or die separation.

In general formula (I), when $l_1$ and $l_2$ are zero, the compound structure is undesirably unstable, and when $l_1$ and $l_2$ are 6 or more, the resultant polymer undesirably has low hardness and low heat resistance. Thus, each of $l_1$ and $l_2$ is limited to an integer of from 1 to 5. Each of $m_1$ and $m_2$ may be zero. However, when they are 6 or more, the resultant polymer undesirably has low hardness and low heat resistance. Each of $m_1$ and $m_2$ are therefore limited to an integer of from 0 to 5. Further, $l_1$ and $l_2$ may be the same or different integer, and $m_1$ and $m_2$ may also be the same or different integer.

The present polymer is a homopolymer of one member selected from monomers represented by general formula (I) or a copolymer of at least two monomers selected from monomers represented by general formula (I). The compositional ratio of the copolymer can be freely selected. One or more monomers of general formula (I) can be copolymerized with some other monomer unless the object of this invention is ruined, and in this case, the amount of the monomer or monomers of general formula (I) is preferably 5 to 99 wt %, particularly preferably 20 to 90 wt %. Examples of the other monomer are (meth)acrylates such as polyurethane (meth)acrylate, bisphenol A (meth)acrylate, polyester (meth)acrylate, etc.

A composition of these monomers can be polymerized by heating it or irradiating it with UV ray in the presence of a polymerization initiator. The polymerization initiator is not critical if it is a type that generates a radical under heat or UV ray irradiation. When the polymerization is carried out by heating, typical examples of the initiator therefor are azobisisobutyronitrile, azobisdimethylvaleronitrile, benzoyl peroxide, etc. When the polymerization is carried out by UV ray irradiation, typical examples of the initiator are 2,2'-diethoxyacetophenone, 2-hydroxy-2-methyl-1-phenylpropan-1-on, benzophenone, Michler's ketone, 2-chlorothioxanthone, 2-isopropylthioxanthone, benzoin, benzoin isobutyl ether, benzyl, benzyl dimethyl ketal, hydroxycyclohexylphenyl ketone, etc. When the above benzophenone, 2-chlorothioxanthone, 2-isopropylthioxanthone or benzyl is used, the UV ray polymerization rate is, advantageously, further promoted by adding a sensitizer such as n-butylamine, triethylamine, diethylaminoethyl methacrylate, isoamyl-p-dimethylaminobenzoate, or the like.

In a preferred mode of this invention, when the above substrate (A) having a concave/convex-formed groove ($a_2$) is formed on the flat base plate ($a_1$), it is preferable to form the groove ($a_2$) of the present polymer by using a monomer composition containing the monomer of general formula (I) as a material for the groove ($a_2$). When the present polymer is formed, it is preferable, in general, to use a 2P method using UV ray irradiation, although a thermal polymerization method may be used depending upon kind and properties of the monomer selected from monomers of general formula (I). The formation of the groove ($a_2$) by the 2P method will be described further in detail below.

For the flat base plate ($a_1$), it is possible to use UV ray-permeable materials such as polymethyl methacrylate, polycarbonate, epoxy resin, glass, etc., and UV ray-impermeable materials such as aluminum, titanium, etc. When the latter UV ray-impermeable materials are used, a UV ray-permeable substance such as glass can be used as a die plate, and the UV ray irradiation can be effected from this die plate side.

The monomer composition containing the monomer of general formula (I) is coated on the base plate ($a_1$) to form a layer of the monomer composition. This coating may be carried out by a pressure-casting method which comprises dropping the monomer composition containing the monomer of general formula (I) on the base plate ($a_1$) or a die plate having an engraved concave/convex form corresponding the concave/convex-formed groove, and pressing it from the above to cast it uniformly. It may be also carried out by a spincoat or immersion method. Then, at room temperature, the monomer composition containing the monomer of the general formula (I) is cured by irradiating it with UV ray from a high-pressure mercury lamp through the base plate ($a_1$) or the die plate such that the total light quantity is 0.5 to 5.0 J/cm$^2$, whereby the concave/convex-formed groove ($a_2$) is formed on, and intimately fixed onto, the base plate ($a_1$). Then, the die plate is separated, and the substrate (A) in which the groove ($a_2$) is firmly fixed onto the base plate ($a_1$) is obtained. Thereafter, a recording layer of a usual inorganic or organic material is formed on the concave/convex groove ($a_2$), whereby an information-recording medium is obtained.

In another preferred embodiment of this invention, the monomer composition containing the monomer of general formula (I) is cast-molded in a mold formed of an original disk having an engraved concave/convex form corresponding to the concave/convex-formed groove, a glass plate having a flat surface and a framing spacer, whereby the substrate (B) is formed in which the flat base plate (b₁) and the concave/convexformed groove (b₂) are integrally formed of the present polymer. In this case, the present polymer may be formed either by a thermal polymerization method or by UV ray-irradiation polymerization method. The formation of the substrate (B) by this thermal or UV ray-irradiation polymerization method is more specifically described below.

A framing spacer is arranged on the surface of an original disk having an engraved concave/convex form corresponding to the concave/convex-formed groove, the monomer composition containing the monomer of general formula (I) is then injected into the space formed with the oridinal disk and the framing spacer, and a disk-like glass plate is placed on the framing spacer to close the space and exert pressure. And, under the pressure, the above monomer composition is polymerized by heating it or irradiating it with UV ray. The original disk as a component of this mold may be that which is formed of a non-transparent material when the polymerization is thermally carried out. However, when the polymerization is carried out by UV ray irradiation, there is used glass, etc., which have transparent faces for the irradiation. The thermal polymerization can be carried out at a temperature between 30° and 150° C. for 10 to 48 hours. The polymerization with UV ray irradiation can be carried out at room temperature by irradiation with UV ray from a high-pressure mercury lamp such that the total light quantity is 1.0 to 200 J/cm². After the polymerization, the original disk is separated to give the substrate (B) in which the base plate (b₁) and the groove (b₂) are integrally formed of one polymer. It is also effective to heat the monomer composition after the UV ray irradiation. Then, a recording layer of a usual inorganic or organic material is formed on the above substrate (B), whereby an information-recording medium is obtained.

The substrate of this invention has been explained hereinabove concerning grooved recording media, and it can be also used for recording media with no groove, as has been described concerning the substrate (C).

Further, the monomer composition containing the monomer of general formula (I) can be used for the purpose of smoothening the substrate surface.

The substrate of this invention can be used as a substrate for information-recording media such as a compact disk, CD-ROM, laser disk, digital data disk, etc., and further for information-recording media according to an optical recording system such as an optical card, etc.

This invention will be explained further in detail hereinbelow by reference to Examples, to which this invention shall not be limited.

EXAMPLES 1-12

Each of various UV ray-curable monomer compositions prepared from a monomer of general formula (I) as a UV ray-curable monomer and a UV ray polymerization initiator (of which the kinds and amounts are shown in Table 1-1) was applied onto a glass disk base plate having a diameter of 130 mm and a thickness of 1.2 mm by a pressure-casting method such that the resultant layer of the UV ray-curable monomer composition had a thickness of 20 μm. Then, a die plate having a concave/convex-formed groove (groove width 0.6 μm, groove depth 0.08 μm, intergroove distance 1.6 μm) corresponding to a concave/convex-formed groove for tracking was brought into contact with the surface of the layer under pressure, and the above monomer composition was cured by irradiating it with UV ray at an illumination intensity of 20 mW/cm² (350 nm) for 1 minute by using a high-pressure mercury lamp from the base plate side, whereby a UV ray-cured resin layer having a concave/convex-formed groove for tracking was formed on the base plate. Then, the die plate was separated to give a substrate having a firmly fixed concave/convex-formed groove for tracking which was formed of the UV ray-cured resin layer. This substrate corresponds to the previously-specified substrate (A) in which the concave/convex-formed groove (a₂) is formed on the flat base plate (a₁).

Then, a recording layer formed of a tellurium alloy made of tellurium, selenium, tellurium carbide and the like was formed on the substrate to give an information-recording medium.

Physical properties of the substrate were evaluated as follows.

Die Removability

When an operation was made to separate a die from a UV ray-cured resin layer, the case of no separation was evaluated as D, the case of partial attachment of a remaining UV ray-cured resin layer to the die when the separation operation was repeated 10 times, 100 times or 1,000 times was evaluated, in this order, as C, B or A. That is, A means excellent die removability, and the die removability becomes poorer in the order of B→C→D.

Hardness

The Vickers hardness of a cured resin was measured under conditions of 10 gf and 10 seconds by using a Vickers hardness microtester supplied by Akashi Seisakusho.

Water Absorptivity

A cured resin film having a size of 30 mm×15 mm×0.2 mm was vacuum-treated at room temperature for 24 hours, and the weight of the cured resin film was taken as a dry weight (Wd). Then, the cured resin film was immersed in water at room temperature for 24 hours, and the weight of the resultant film was taken as a wet weight (Ww). The water absorptivity was calculated on the basis of the following equation.

$$\text{Water absorptivity} = \frac{Ww - Wd}{Wd} \times 100$$

Heat resistance (glass transition point)

The glass transition point (Tg) of a cured resin was determined by measuring a DSC curve by using a thermal analyzer supplied by K.K. Rigaku at a temperature elevation rate of 20° C./min.

Table 1-1 shows the results.

Comparative Examples 1-4

The procedure of Examples 1-12 was repeated except that a monomer composition for comparison was used in place of the monomer composition containing the monomer of general formula (I), whereby a substrate for an information-recording medium was obtained. (The kinds and amounts of UV ray-curable monomers and polymerization initiators used in these Comparative Examples are as shown in Table 1-2.) Physical properties of the resultant substrates for informationrecording media were evaluated in the same way as in Examples 1-12. Table 1-2 shows the results.

As is clearly shown in Tables 1-1 and 1-2, the substrates for information recording media, obtained in Examples 1-12, had excellent die removability and excellent replication accuracy over those obtained in Comparative Examples 1-4. It is also clear that the UV ray-cured resin layers of the substrates for information recording media, obtained in Examples 1-12, had higher hardness and higher heat resistance than those obtained in Comparative Examples 1-4, and maintained better replication accuracy after the recording layer formation. And, since the UV ray-cured resin layers of the substrates for information recording media, obtained in Examples 1-12, had lower water absorptivity than those obtained in Comparative Examples 1-4, the UV ray-cured resin layers maintained a transferred form in good accuracy even in a long-term storage of the information recording media, and no corrosion of the recording layers was found.

EXAMPLES 13 AND 14

A framing spacer was arranged on the surface of an original disk having a concave/convex-formed groove (groove width 0.6 μm, groove depth 0.08 μm, intergroove distance 1.6 μm) corresponding to a concave/convex groove for tracking. And, a monomer composition prepared by incorporating into a monomer of general formula (I) a polymerization initiator and, optionally, a monomer other than the monomer of general formula (I) (kinds and amounts of the monomers and polymerization initiator are shown in Table 2) was injected into the space formed with the original disk and the framing spacer, and a disk-like glass plate having planar surfaces was placed on the framing spacer to close the space and press the monomer composition. Then, the monomer composition was cured by heating it at 40° C. for 10 hours, at 50° C. for 5 hours, at 60° C. for 5 hours and at 120° C. for 5 hours. Thereafter, the original disk and the disk-like glass plate were separated to give a disk-like substrate having a concave/convex-formed groove for tracking. That is, this substrate corresponds to the previously-specified substrate (B) in which the flat base plate ($b_1$) and the concave/convex-formed groove ($b_2$) are integrally formed of one polymer at one step.

Then, a recording layer formed of a tellurium alloy made of tellurium, selenium, tellurium carbide and the like was formed on the substrate to give an information-recording medium.

EXAMPLES 15-16

A framing spacer was arranged on the surface of an original disk having a concave/convex-formed groove (groove width 0.6 μm, groove depth 0.08 μm, intergroove distance 1.6 μm) corresponding to a concave/convex groove for tracking. And, a monomer composition prepared by incorporating into a monomer of general formula (I) a polymerization initiator and, optionally, a monomer other than the monomer of general formula (I) (kinds and amounts of the monomers and polymerization initiator are shown in Table 2) was injected into the space formed with the original disk and the framing spacer, and a disk-like glass plate having planar surfaces was placed on the framing spacer to close the space and press the monomer composition. Then, the monomer composition was cured by irradiating it at an illumination intensity of 30 mW/cm² for 2 minutes by using a high-pressure mercury lamp from the glass plate side. Then, the original disk and the glass plate were separated to give a disk-like substrate having a concave/convex-formed groove for tracking. That is, this substrate also corresponds to the previously-specified substrate (B).

Then, a recording layer formed of a tellurium alloy made of tellurium, selenium, tellurium carbide and the like was formed on the subsrtate to give an information-recording medium.

Physical properties (die removability, hardness, heat resistance and water absorptivity) of the substrates obtained in the above Examples 13 to 16 were evaluated in the same way as in Examples 1 to 12, and the birefringence of these substrates was evaluated as follows.

Birefringence

A retardation was measured by using a He-Ne laser beam (623 nm), and the resultant value was taken as a birefringence.

Comparative Example 5

The procedure of Examples 13-16 was repeated except that a monomer composition for comparison shown in Table 2 was used in place of the monomer composition containing the monomer of general formula (I), whereby a substrate for informationrecording media was obtained. (The kinds and amounts of the monomer and polymerization initiator used in this Comparative Example are as shown in Table 2.) Physical properties of the resultant substrates for information-recording media were evaluated in the same way as in Examples 13-16. Table 2 shows the results.

Comparative Example 6

A substrate for information-recording media was obtained by injection-molding a polycarbonate resin. Physical properties of the substrate was evaluated in the same way as in Examples 13 to 16. Table 2 shows the results.

As is clearly shown in Table 2, the substrates for information recording media, obtained in Examples 13-16, had excellent die removability and excellent replication accuracy over those obtained in Comparative Examples 5 and 6. It is also clear that the substrates for information recording media, obtained in Examples 13-16, had high hardness and high heat resistance, and maintained better replication accuracy after the recording layer formation. And, the substrates obtained in Examples 13-16 had lower water absorptivity than those obtained in Comparative Examples 5 and 6, and therefore, maintained a transferred form in good accuracy even in a long-term storage of the information recording media, and no corrosion of their recording layers was found. Further, their birefringence was small. Therefore, it is clear that information-recording media having excellent write and read characteristics can be produced.

TABLE 1

| Composition (parts by weight) | Die Removability | Vickers Hardness | Tg (°C.) | Water Absorptivity (%) |
|---|---|---|---|---|
| Example No. | | | | |

TABLE 1-continued

| | Composition (parts by weight) | Die Removability | Vickers Hardness | Tg (°C.) | Water Absorptivity (%) |
|---|---|---|---|---|---|
| 1 | BPFA-1/TCA/HCPK (80/20/2) | A | 18.1 | >200° C. | 0.35 |
| 2 | BPFMA-1/TCDA/HCPK (20/80/2) | A | 18.4 | >200° C. | 0.72 |
| 3 | BPFA-1/TCDA/TCA/HCPK (25/60/15/2) | A | 18.9 | >200° C. | 0.61 |
| 4 | BPFMA-2/TMPTA/HCPK (5/95/4) | A | 19.4 | >200° C. | 0.64 |
| 5 | BPFA-1/TCDA/TCA/HCPK (50/35/15/2) | A | 21.0 | >200° C. | 0.50 |
| 6 | BPFA-3/NPGDA/HCPK (40/60/2) | A | 18.6 | >200° C. | 0.78 |
| 7 | BPFA-4/R-551/HCPK (60/40/3) | A | 18.0 | >200° C. | 0.66 |
| 8 | BPFMA-5/M-7100/CHMA/HCPK (70/10/20/4) | A | 19.6 | >200° C. | 0.81 |
| 9 | BPFA-6/UA-306 I/HCPK (94/6/4) | A | 20.5 | >200° C. | 0.94 |
| 10 | BPFA-7/IBMA/HCPK (90/10/3) | A | 19.8 | >200° C. | 0.87 |
| 11 | BPFA-1/HCPK (100/2) | A | 20.2 | >200° C. | 0.54 |
| 12 | BPFMA-1/BPFA-2/HCPK (20/80/2) | A | 21.3 | >200° C. | 0.48 |
| Comparative Example No. | | | | | |
| 1 | Monomer A/HCPK (100/4) | C | 7.3 | 30 | 1.1 |
| 2 | Monomer B/HCPK (100/4) | B | 18.0 | 40 | 4.6 |
| 3 | Monomer C/HCPK (100/3) | D | 18.0 | 80 | 4.2 |
| 4 | ICTA/EHA/HCPK (50/50/4) | C | 11.8 | 62 | 4.8 |

TABLE 2

| | Composition (parts by weight) | Die Removability | Vickers Hardness | Tg (°C.) | Water Absorptivity (%) | Birefringence (nm) |
|---|---|---|---|---|---|---|
| Example No. | | | | | | |
| 13 | BPFA-1/TCA/HCPK (80/20/2) | A | 18.1 | >200° C. | 0.35 | 9 |
| 14 | BPFA-2/TCDA/TCA/HCPK (25/60/15/2) | A | 18.5 | >200° C. | 0.61 | 10 |
| 15 | BPFMA-3/NPGDA/HCPK (40/60/2) | A | 18.6 | >200° C. | 0.74 | 12 |
| 16 | BPFA-1/HCPK (100/2) | A | 20.2 | >200° C. | 0.54 | 11 |
| Comparative Example No. | | | | | | |
| 5 | Monomer C/TCDA/HCPK (30/70/2) | D | 18 | 110 | 2.4 | 12 |
| 6 | Polycarbonate | B | 11 | 150 | 0.2 | 30 |

Abbreviations used in Tables 1-1, 1-2 and 2 stand for the following substances.

1. BPFA-1: monomer of general formula (I) wherein $m_1$ and $m_2=0$, and $R_1$ and $R_2=H$
2. BPFMA-1: monomer of general formula (I) wherein $m_1$ and $m_2=0$, and $R_1$ and $R_2=CH_3$
3. BPFA-2: monomer of general formula (I) wherein $m_1$ and $m_2=1$, $l_1$ and $l_2=2$, and $R_1$ and $R_2=H$
4. BPFMA-2: monomer of general formula (I) wherein $m_1$ and $m_2=1$, $l_1$ and $l_2=2$, and $R_1$ and $R_2=CH_3$
5. BPFA-3: monomer of genera formula (I) wherein $m_1$ and $m_2=1$, $l_1$ and $l_2=3$, and $R_1$ and $R_2=H$
6. BPFMA-3: monomer of general formula (I) wherein $m_1$ and $m_2=1$, $l_1$ and $l_23$, and $R_1$ and $R_2=CH_3$
7. BPFA-4: monomer of general formula (I) wherein $m_1$ and $m_2=2$, $l_1$ and $l_2=1$, and $R_1$ and $R_2=H$
8. BPFMA-5: monomer of general formula (I) wherein $m_1$ and $m_2=2$, $l_1$ and $l_1=2$, and $R_1$ and $R_2=CH_3$
9. BPFA-6: monomer of general formula (I) wherein $m_1$ and $m_2=3$, $l_1$ and $l_2=1$, and $R_1$ and $R_2=H$
10. BPFA-7: monomer of general formula (I) wherein $m_1$ and $m_2=3$, $l_1$ and $l_2=2$, and $R_1$ and $R_2=H$
11. TCA: tricyclo[5,2,1,0$^{2.6}$]decyl acrylate
12. TCDA: bisacryloxymethyltricyclo[5,2,1,0$^{2.6}$]decane
13. TMPTA: trimethylolpropane triacrylate
14. NPGDA: Neopentylglycol diacrylate
15. R-551: bisphenol A-ethylene oxide-modified diacrylate (supplied by Nippon Kayaku K.K.)
16. M-7100: oligoester acrylate (supplied by Toa Gosei Kagaku K.K.)
17. CHMA: Cyclohexyl methacrylate 18. UA-603 I: Urethane acrylate (supplied by Kyoeisha Ushikagaku Kogyo K.K.)
19. IBMA: Isobornyl methacrylate
20. HCPK: 7-hydroxycyclohexylphenyl ketone
21. Monomer-A: bisphenol F-ethylene oxide-modified diacrylate
22. Monomer-B: Urethane acrylate
23. Monomer-C: epoxy acrylate produced by a reacting a bisphenol A-type epoxy resin with acrylic acid
24. ICTA:

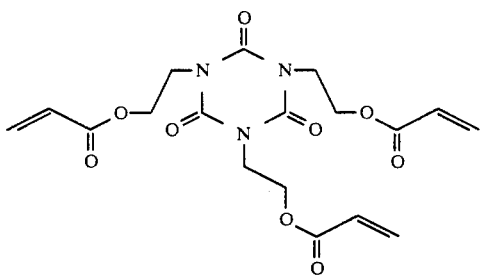

25. EHA: 2-ethylhexyl acrylate

As described above, since the substrate for information-recording media, provided by this invention, exhibits good die removability when produced, it has excellent dimensional stability. And, it also has characteristics in that it has excellent heat resistance and hardness, and its water absorptivity is low. By using the substrate of this invention, therefore, information-recording media having excellent write and read characteristics and excellent storage stability can be obtained.

Further, due to low birefringence, this invention can be applied not only to a concave/convex-formed groove of the substrate but also a substrate in which the concave/convexformed groove and the flat base plate are integrally formed.

What is claimed is:

1. A substrate for information recording media, on which a recording layer is formed and at least a part of the substrate is composed of a polymer containing a monomer represented by the formula (I)

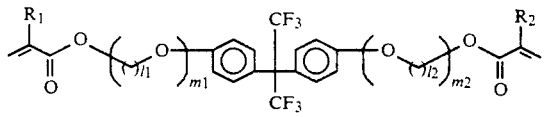

wherein each of $l_1$ and $l_2$ represents an integer of from 1 to 5 and may be the same as, or different from, the other, each of $m_1$ and $m_2$ represents an integer of from 0 to 5 and may be the same as, or different from, the other, and each of $R_1$ and $R_2$ represents a hydrogen atom or a methyl group, and may be the same, or different from, the other.

2. A substrate according to claim 1, which contains one member selected from the group consisting of:
    (i) a substrate (A) produced by forming a polymer into a concave/convex-formed groove ($a_2$) on a flat base plate ($a_1$) by a 2P method or a thermal polymerization method,
    (ii) a substrate (B) formed by cast-molding one monomer composition in a casting molded prepared by using an original disk having a concave/convex form, in which a flat base plate ($b_1$) and a concave/convex-formed groove ($b_2$) are integrally formed of one polymer at one step, and
    (iii) a flat substrate (C) formed of one layer or a multilayer laminate, of which both surfaces are planar.

3. A substrate according to claim 2, which is the substrate (A) wherein the flat base plate ($a_1$) and/or the concave/convex-formed grove ($a_2$) are formed of a polymer containing a monomer represented by formula (I).

4. A substrate according to claim 2, which is the substrate (B) wherein the flat base plate ($b_1$) and the concave/convex-formed groove ($b_2$) are integrally formed of a polymer containing a monomer represented by formula (I).

5. A substrate according to claim 2, which is the flat substrate (C) which is formed of one layer and totally and integrally formed of a polymer containing a monomer represented by formula (I).

6. A substrate according to claim 2, which is the flat substrate (C) formed of a plurality of layers wherein at least one layer is formed of a polymer containing a monomer represented by formula (I).

7. A substrate according to claim 1, wherein the polymer is a homopolymer of a monomer selected from monomers represented by formula (I) or a copolymer of at least two monomers selected from monomers represented by formula (I).

8. A substrate according to claim 1, wherein the polymer is a copolymer of a monomer or at least two monomers selected from monomers represented by formula (I) with another monomer.

9. A substrate according to claim 8, wherein the other monomer is at least one (meth)acrylate selected from the group consisting of polyurethane (meth)acrylate, bisphenol A (meth)acrylate and polyester (meth)acrylate.

10. A substrate according to claim 8, wherein the copolymer contains 5 to 99% by weight of the monomer or monomers represented by general formula (I).

* * * * *